United States Patent
Saha et al.

(10) Patent No.: US 12,028,915 B1
(45) Date of Patent: Jul. 2, 2024

(54) DUAL CONNECTIVITY BASED ON PATH LOSS AND TRANSMIT POWER

(71) Applicant: Sprint Spectrum LP, Overland Park, KS (US)

(72) Inventors: Sougata Saha, Lakeside, CA (US); Sreekar Marupaduga, Overland Park, KS (US); Anurag Thantharate, Overland Park, KS (US); Kavitha Swaminathan, Olathe, KS (US)

(73) Assignee: Sprint Spectrum LP, Overland Park, KS (US)

( * ) Notice: Subject to any disclaimer, the term of this patent is extended or adjusted under 35 U.S.C. 154(b) by 655 days.

(21) Appl. No.: 17/119,424

(22) Filed: Dec. 11, 2020

(51) Int. Cl.
*H04W 76/15* (2018.01)
*H04W 24/10* (2009.01)
*H04W 36/00* (2009.01)
*H04W 52/24* (2009.01)

(52) U.S. Cl.
CPC .......... *H04W 76/15* (2018.02); *H04W 24/10* (2013.01); *H04W 36/0069* (2018.08); *H04W 36/00837* (2018.08); *H04W 52/242* (2013.01)

(58) Field of Classification Search
CPC . H04W 76/15; H04W 24/10; H04W 36/0069; H04W 36/00837; H04W 52/242
See application file for complete search history.

(56) References Cited

U.S. PATENT DOCUMENTS

| | | | | |
|---|---|---|---|---|
| 2013/0329631 | A1* | 12/2013 | Alam | H04W 52/50 370/328 |
| 2014/0092866 | A1* | 4/2014 | Teyeb | H04W 36/0069 370/331 |
| 2015/0065135 | A1* | 3/2015 | Claussen | H04W 36/00837 455/436 |
| 2016/0219466 | A1* | 7/2016 | Uchino | H04L 5/0055 |
| 2017/0265241 | A1* | 9/2017 | Fujishiro | H04W 16/14 |
| 2019/0069308 | A1* | 2/2019 | Lee | H04W 28/085 |
| 2020/0022035 | A1 | 1/2020 | Kadiri et al. | |
| 2020/0260319 | A1* | 8/2020 | Basu Mallick | H04W 28/0278 |
| 2020/0275497 | A1* | 8/2020 | Aoyagi | H04W 76/12 |
| 2020/0351735 | A1* | 11/2020 | Latheef | H04W 36/0085 |

(Continued)

FOREIGN PATENT DOCUMENTS

| WO | 2020069664 A1 | 4/2020 |
|---|---|---|
| WO | WO-2021188852 A1 * | 9/2021 |

OTHER PUBLICATIONS

Santhanam et al., Techniques for measurement reporting and transmit power allocation in power-constrained environment, (U.S. Appl. No. 63/98488), filed Oct. 22, 2020, USPTO, whole document (Year: 2020).*

(Continued)

*Primary Examiner* — Michael Thier
*Assistant Examiner* — Jose L Perez
(74) *Attorney, Agent, or Firm* — Jones Robb, PLLC (57) ABSTRACT

Attaching to additional access nodes and performing handovers responsive to path loss measurements and uplink transmit power levels meeting different thresholds. A wireless device attached to a first access node is experiencing one or more of a threshold path loss or a threshold uplink transmit power is instructed to enable dual connectivity, wherein the wireless device remains attached to the first access node. Embodiments include 5G EN-DC systems that are collocated or distributed.

15 Claims, 8 Drawing Sheets

(56) References Cited

U.S. PATENT DOCUMENTS

| | | | | |
|---|---|---|---|---|
| 2020/0413286 A1* | 12/2020 | Yi | ............................ | H04L 1/1812 |
| 2021/0007028 A1* | 1/2021 | Liang | ................. | H04W 36/0027 |
| 2021/0219193 A1* | 7/2021 | Teyeb | ................ | H04W 36/0072 |
| 2022/0132377 A1* | 4/2022 | Santhanam | ...... | H04W 36/00837 |
| 2022/0264484 A1* | 8/2022 | Chen | .................. | H04W 36/0055 |
| 2022/0330364 A1* | 10/2022 | Aghighi | ................. | H04W 76/15 |
| 2023/0032077 A1* | 2/2023 | He | .......................... | H04W 76/19 |

OTHER PUBLICATIONS

Sabouri-Sichani et al., UE-based energy efficient uplink data split in dual connectivity (U.S. Appl. No. 62/992,574), filed Mar. 20, 2020, USPTO, whole document (Year: 2020).*

* cited by examiner

DUAL CONNECTIVITY BASED ON PATH LOSS AND TRANSMIT POWER

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. As wireless technology continues to improve, various different iterations of radio access technologies (RATs) may be deployed within a single wireless network. Such heterogeneous wireless networks can include newer 5G and millimeter wave (mm-Wave) networks, as well as older legacy networks (such as 4G long-term evolution or LTE). In some cases, deployment of 5G new radio (NR) access nodes alongside or co-located with 4G LTE access nodes utilizes dual connectivity technology (e.g. EN-DC), wherein control information is transmitted using the 4G RAT and data is transmitted using the 5G RAT. There are various potential deployments of EN-DC, such as one-to-one (where a 4G eNodeB is collocated with a 5G gNodeB at the same cell site or radio access network), or one-to-many (where a 4G eNodeB at a first radio access network is coupled via X2 links to many different 5G gNodeBs, each within their own radio access network or cell site). Each radio access network (RAN) or cell site can further include a cell site router, which provides connectivity to other network elements, such as an intermediate or core network. The connection between the cell site router and other network elements closer to the core network may be referred to as a mobile backhaul.

Further, as wireless device technology improves, increasing numbers of wireless devices are using various transmission modes such as dual connectivity and multiple input multiple output (MIMO). However, transitioning to these advanced technologies in today's heterogenous wireless networks can be associated with problems. In particular, load balancing of wireless devices between two or more neighboring access nodes can be problematic, particularly when the wireless devices encounter different types of air interface conditions, such as fading, or throughput. For example, performing handovers of wireless devices is typically based on signal levels of reference signals, e.g. RSRP levels from different access nodes including source and target access nodes. However, handovers do not take into account other signal conditions such as fading, path loss, modulation and coding schemes (MCS), and resulting uplink transmit power. Further, in dual connectivity networks (such as 5G EN-DC), selection of additional access nodes for dual connectivity and/or handover do not take into account these conditions. Thus, indiscriminately performing handovers can negatively impact a quality of service for the wireless device, even when the signal levels of a target access node may be more desirable.

OVERVIEW

Exemplary embodiments described herein include methods, systems, and processing nodes for attaching to additional access nodes and performing handovers responsive to path loss measurements and uplink transmit power levels meeting different thresholds. An exemplary method attaching to additional access nodes in a wireless network includes determining that a wireless device attached to a first access node is experiencing one or more of a threshold path loss or a threshold uplink transmit power, and instructing the wireless device to attach to one or more additional access nodes or enabling a dual connectivity mode of operation, wherein the wireless device remains attached to the first access node.

Another exemplary method for attaching to additional access nodes based on path loss and transmit power includes determining that a wireless device attached to a first access node is associated with a path loss or an uplink transmit power that exceeds a first threshold, instructing the wireless device to identify and attach to one or more additional access nodes without setting up a data bearer, and upon the path loss or an uplink transmit power exceeding a second threshold greater than the first threshold, setting up the data bearer between the wireless device and the one or more additional access nodes.

Another exemplary method for attaching to additional access nodes includes determining that a wireless device attached to a first access node is experiencing one or more of a threshold path loss or a threshold uplink transmit power, and instructing the wireless device to attach to one or more additional access nodes while remaining attached to the first access node.

The exemplary embodiments described herein may be performed by a processing node within a system, such as a telecommunication system. Exemplary systems for attaching to additional access nodes based on path loss and transmit power can include processing nodes that are configured to perform any of the disclosed operations in various combinations. For example, a processing node for attaching to additional access nodes is configured to perform operations including determining that a wireless device attached to a first access node is experiencing one or more of a threshold path loss or a threshold uplink transmit power, and instructing the wireless device to attach to one or more additional access nodes or enabling a dual connectivity mode of operation, wherein the wireless device remains attached to the first access node.

An exemplary processing node for attaching to additional access nodes based on path loss and transmit power is configured to perform operations including determining that a wireless device attached to a first access node is associated with a path loss or an uplink transmit power that exceeds a first threshold, instructing the wireless device to identify and attach to one or more additional access nodes without setting up a data bearer, and upon the path loss or an uplink transmit power exceeding a second threshold greater than the first threshold, setting up the data bearer between the wireless device and the one or more additional access nodes.

Another exemplary processing node for attaching to additional access nodes is configured to perform operations including determining that a wireless device attached to a first access node is experiencing one or more of a threshold path loss or a threshold uplink transmit power, and instructing the wireless device to attach to one or more additional access nodes while remaining attached to the first access node.

DETAILED DESCRIPTION

The following disclosure provides methods and systems for identifying additional access nodes to attach to and initiate handovers based on path loss and transmit power levels experienced by wireless devices. Whereas previously, attaching to additional access nodes (i.e. dual-connectivity) as well as performing handovers to additional access nodes was performed solely based on reference signal levels, and triggered based on measurements of the reference signals (e.g. A4/A5 thresholds), embodiments described herein include identification of additional access nodes by wireless devices experiencing high path losses and utilizing high transmit power levels, and connecting to the additional access nodes with or without creating any data bearers depending on threshold path loss and uplink transmit power levels. Whereas in the past, wireless devices experiencing fading (which leads to path loss) would wait for handover measurement triggers from the wireless network, the disclosed embodiments include instructing the wireless device to measure path losses from neighboring access nodes and initiate a parallel (or dual) connection with eligible neighboring access nodes. When the path loss level meets another high threshold, the wireless device can begin transmitting data to/from the eligible neighboring access nodes. Thus, the device throughput increases to overcome the fading. In another example, a modulation and coding scheme (MCS) assigned to a wireless device results in the wireless device increasing an uplink transmit power to a threshold. The wireless device is then instructed to initiate parallel (or dual) connections with additional neighboring access nodes without activating any data bearers. Upon the transmit power increasing to meet another threshold, the wireless device is instructed to start transmitting/receiving data from the additional access nodes, thereby increasing throughput in poor radio frequency conditions.

Various combinations of these operations are described herein, including in collocated EN-DC systems (comprising a 4G LTE eNodeB and 5G NR gNodeB within the same radio access network or RAN), and distributed or one-to-many EN-DC systems (comprising a 4G LTE eNodeB at a first RAN, and different 5G gNodeBs at different RANs respectively). Methods described herein include determining that a wireless device attached to a first access node is experiencing one or more of a threshold path loss or a threshold uplink transmit power, and instructing the wireless device to attach to one or more additional access nodes. For example, a dual-connectivity mode of operation may be activated or enabled for the wireless device. Further, the path loss or uplink transmit power of the wireless device may be between a first and second threshold, such that the wireless device attaches to the one or more additional access nodes without data bearers. Whereas, if the path loss or uplink transmit power of the wireless device exceeds the second threshold, data bearers are set up between the wireless device and the one or more additional access nodes. In exemplary embodiments described herein, the wireless device and source access node are configured to utilize a dual-connectivity operating mode with at least two different radio access technologies (RATs). For example, access nodes described herein can communicate using a plurality of radio air interfaces. For example, the access node can include a combination of a 4G eNodeB and a 5G gNodeB. In other words, the access node can be configured to communicate using 4G LTE as well as using 5G NR. Further, the access node can include a plurality of antennae (or antenna elements). Each antenna element can be configured to deploy a different radio air interface using a different frequency. For example, each antenna element can be configured to deploy a 4G LTE air interface or a 5G NR air interface. Different quantities of antenna elements can be configured to deploy (or "assigned" to) a different type of air interface, depending on the needs of a network operator or users.

Further, in dual-connectivity mode, the wireless device is instructed to maintain communication with the first access node while attaching to the one or more additional access nodes. In an exemplary embodiment, the first access node comprises a eNodeB, and the one or more additional access nodes comprise gNodeBs, such that EN-DC is activated for the wireless device as it initiates a dual connection with one or more gNodeBs while remaining attached to the eNodeB. In another exemplary embodiment, the first access node and the one or more additional access nodes comprise eNodeBs that are each coupled to at least one gNodeB. In this case, the wireless device may be selecting between primary access nodes in a dual-connectivity system, and may subsequently request a handover to the one or more additional access nodes from the first access node. In another exemplary embodiment, the first access node and the one or more additional access nodes comprise gNodeBs that are each coupled to an eNodeB. In this case, the wireless device may be selecting between secondary access nodes in a dual-connectivity system, while remaining attached or connected to an eNodeB. In either case, the method can further include initiating a handover procedure of the wireless device to one of the one or more additional access nodes. For example, when the first access node signal level drops, the target access node is already pre-selected from at least one of the one or more additional access nodes.

Further, the wireless device can be experiencing a threshold path loss in its communication link with the first access node, in which case it is further instructed to identify the one or more additional access nodes as those being associated with a path loss below the threshold path loss. Identifying the one or more additional access nodes associated with the path loss below the threshold path loss can be based on reference signals from the one or more additional access nodes, as measured by the wireless device. Alternatively or in addition, the wireless device can be experiencing a threshold uplink transmit power, in which case the wireless device is instructed to identify the one or more additional access nodes based on a reference signal measurement. For example, the threshold uplink transmit power is associated with an uplink transmission between the wireless device and the first access node, and the signal measurement is performed for reference signals from the one or more additional access nodes. The wireless device can measure an RSRP for example, and determine that it would use less uplink power upon which it initiates connections with those additional access nodes.

These operations may be performed by an exemplary system described herein and comprising at least a processing node and a processor coupled to the processing node, and similar operations may be performed by a processing node communicatively coupled to any other network node within the wireless network. These and other embodiments are further described herein and with reference to FIGS. 1-8.

Figure 1:
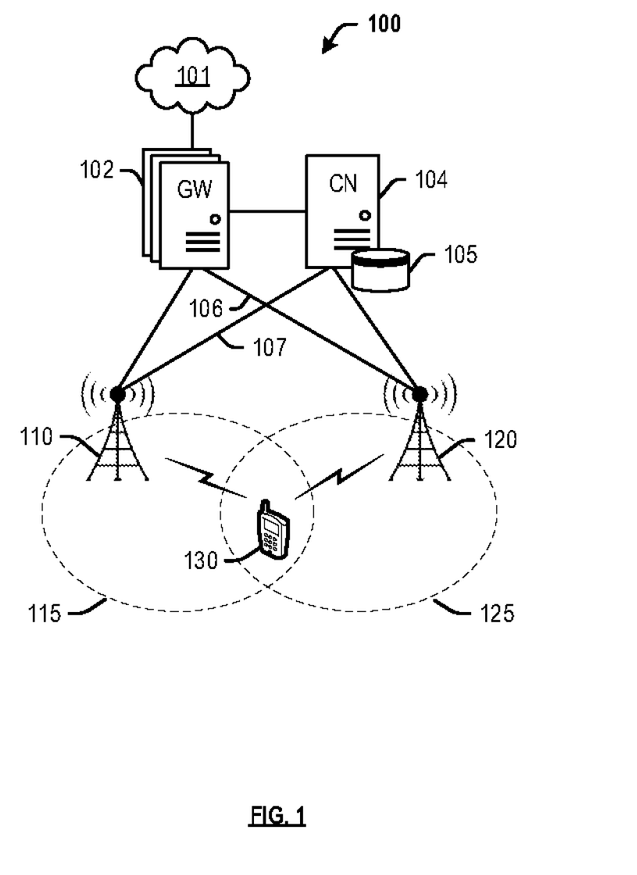
FIG. 1 depicts an exemplary system for attaching to additional access nodes based on path loss and transmit power.

FIG. 1 depicts an exemplary system 100 comprising a communication network 101, gateway 102, controller node 104, access nodes 110, 120, and wireless device 130. In this exemplary embodiment, each of access nodes 110, 120 may be configured to deploy at least two wireless air interfaces, including 4G LTE and 5G NR. Each wireless air interface may be configured to utilize a different frequency band or sub-band, a different channel size or bandwidth, and so on. For example, the 5G NR interface may be configured to utilize higher frequencies and larger channel bandwidths than the 4G LTE interface. Further, each access node 110, 120 can be configured to deploy at least two wireless air interfaces using dual connectivity. For example, each access node 110, 120 can include a combination of an eNodeB and a gNodeB, such that each access node is configured to deploy a wireless air interface using a first RAT (e.g. 4G LTE) and a second RAT (e.g. 5G NR). Further, each access node 110, 120 can be configured to communicate using both RATs at the same time. For example, dual connections can be set up with wireless device 130 using both 4G and 5G wireless air interfaces, with the 4G wireless air interface being used to transmit control information, and the 5G wireless air interface being used to transmit data information. In another example, either control or data transmissions may be transmitted using either 4G or 5G wireless air interface. In another example, a standalone 5G access node may be configured to deploy multiple 5G wireless air interfaces. Further, each of access nodes 110, 120 can be configured to perform carrier aggregation. For example, a gNodeB portion of each access node 110, 120 can be configured to aggregate two or more 5G NR carriers, to which a 5G NR transceiver in wireless device 130 can attach. Other implementations may be evident to those having ordinary skill in the art in light of this disclosure. Further, while access nodes 110, 120 and wireless device 130 are illustrated in FIG. 1, system 100 can include various other combinations of carriers/wireless air interfaces, antenna elements, access nodes, and wireless devices, as may be evident to those having ordinary skill in the art in light of this disclosure.

A processing node within system 100 (for example, communicatively coupled to access node 110 or any other network node) can be configured to determine that wireless device 130, while attached to access node 110, is experiencing one or more of a threshold path loss or a threshold uplink transmit power, and instructing the wireless device 130 to attach to one or more additional access nodes such as access node 120. For example, the first and second access nodes 110, 120 can be eNodeBs, gNodeBs, or any combination of these. Thus, the wireless device 130 is instructed to attach to access node 120 in response to experiencing a threshold path loss or utilizing a threshold uplink transmit power. Further, the path loss or uplink transmit power of the wireless device 130 may be between a first and second threshold, such that the wireless device 130 attaches to the one or more additional access nodes 120 without data bearers. Whereas, if the path loss or uplink transmit power of the wireless device 130 exceeds the second threshold, data bearers are set up between the wireless device 130 and the one or more additional access nodes 120. Further, the wireless device 130 is instructed to maintain communication with the first access node 110 while attaching to the one or more additional access nodes 120. In exemplary embodiments described herein, the wireless device 130 and source access node 110 are configured to utilize a dual-connectivity operating mode with at least two different radio access technologies (RATs). For example, the first access node 110 and the one or more additional access nodes 120 comprise eNodeBs that are each coupled to at least one gNodeB (not shown herein). In this case, the wireless device 130 may be selecting between primary access nodes in a dual-connectivity system, and may subsequently request a handover to the one or more additional access nodes 120 from the first access node 110 (if, for example, when a reference signal level of the first access node 110 drops below a threshold, in which case the target access node 120 is already connected to the wireless device 130.

Further, the wireless device 130 can be experiencing a threshold path loss in its communication link with the first access node 110, in which case it is further instructed to identify the one or more additional access nodes 120 as those being associated with a path loss below the threshold path loss. Identifying the one or more additional access nodes 120 associated with the path loss below the threshold path loss can be based on reference signals from the one or more additional access nodes 120, as measured by the wireless device 130. Alternatively or in addition, the wireless device 130 can be experiencing a threshold uplink transmit power, in which case the wireless device 130 is instructed to identify the one or more additional access nodes 120 based on a reference signal measurement. For example, the threshold uplink transmit power is associated with an uplink transmission between the wireless device 130 and the first access node 110, and the signal measurement is performed for reference signals from the one or more additional access nodes 120. The wireless device 130 can measure an RSRP for example, and determine that it would use less uplink power upon which it initiates connections with those additional access nodes 120.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a next generation or gigabit NodeB device (gNodeB) in 5G networks, or the like. In an exemplary embodiment, a macro-cell access node can have a coverage area 115, 125 in the range of approximately five kilometers to thirty-five kilometers and an output power in the tens of watts. Alternatively, access nodes 110, 120 may comprise any short range, low power, small-cell access nodes such as a microcell access node, a picocell access node, a femtocell access node, or a home eNodeB/gNodeB device.

Access nodes 110, 120 can comprise a processor and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other, and other access nodes (not shown), using a wireless link or a wired link such as an X2 link. Components of exemplary access nodes 110, 120 and processing nodes coupled thereto are further described with reference to FIGS. 2-3.

Wireless device 130 may be any device, system, combination of devices, or other such communication platform capable of communicating wirelessly with access nodes 110, 120 using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), S1, optical networking, hybrid fiber coax (HFC), telephony, Ti, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106, 107 can be a direct link or might include various equipment, intermediate components, systems, and networks, such as a cell site router, etc. Communication links 106, 107 may comprise many different signals sharing the same link. Communication links 106, 107 may traverse and/or interface with many different reference points, such as n1, n2, n3, n4, n5, n6, n7, etc., as well as s1, s3, s4, s5, etc.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW) associated with 4G LTE networks, or a user plane function (UPF) associated with 5G NR networks. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to components of system 100, such as capabilities of access nodes 110, 120, past or current uplink usage requirements capabilities of wireless device 130, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 120, controller node 104, and/or network 101.

Figure 2:
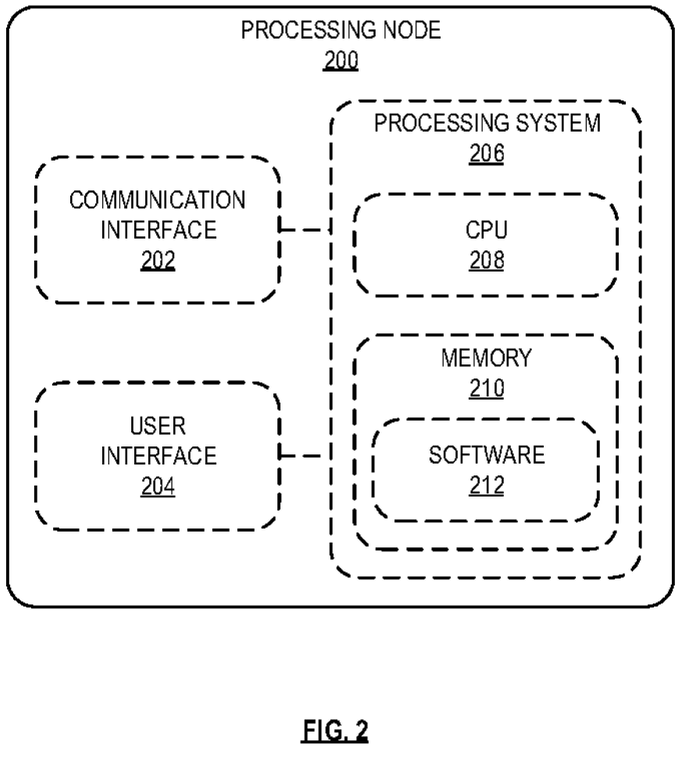
FIG. 2 depicts an exemplary processing node for attaching to additional access nodes based on path loss and transmit power.

FIG. 2 depicts an exemplary processing node 200. Processing node 200 comprises a communication interface 202, user interface 204, and processing system 206 in communication with communication interface 202 and user interface 204. Processing system 206 includes a central processing unit (CPU) 208, and a memory 210, which can comprise a disk drive, flash drive, memory circuitry, or other memory device. Memory 210 can store computer programs, firmware, or some other form of machine-readable instructions, including an operating system, utilities, drivers, network interfaces, applications, or some other type of software. Processing system 206 may include other circuitry to retrieve and execute software 212 from memory 210. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Further, memory 210 can store a software 212, which may be executed to perform the operations described herein. In an exemplary embodiment, software 212 can include instructions for attaching to additional access nodes in a wireless network by determining that a wireless device attached to a first access node is experiencing one or more of a threshold path loss or a threshold uplink transmit power, and instructing the wireless device to attach to one or more additional access nodes.

In another exemplary method, software 212 can include instructions for attaching to additional access nodes on path loss and transmit power, by determining that a wireless device attached to a first access node is associated with a path loss or an uplink transmit power that exceeds a first threshold, instructing the wireless device to identify and attach to one or more additional access nodes without setting up a data bearer, and upon the path loss or an uplink transmit power exceeding a second threshold greater than the first threshold, setting up the data bearer between the wireless device and the one or more additional access nodes.

In another exemplary method, software 212 can include instructions for attaching to additional access nodes in a wireless network, by determining that a wireless device attached to a first access node is experiencing one or more of a threshold path loss or a threshold uplink transmit power, and instructing the wireless device to attach to one or more additional access nodes while remaining attached to the first access node.

Figure 3:
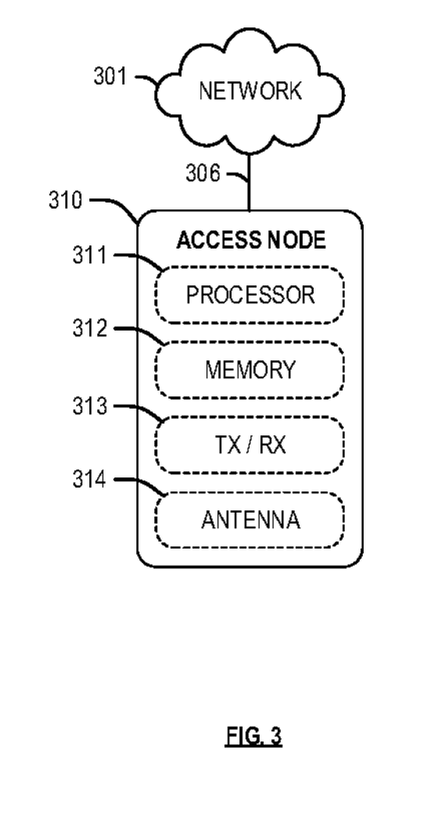
FIG. 3 depicts an exemplary access node for attaching to additional access nodes based on path loss and transmit power.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, a transceiver 313, and antennae 314 (hereinafter referred to as antenna elements 314). Processor 311 executes instructions stored on memory 312, and transceiver 313 (in conjunction with antenna elements 314) enable wireless communication respectively at least two wireless air interfaces, such as 4G LTE and 5G NR. For example, access node 310 may be configured to transmit control information using a first set of antennae elements 314 configured to utilize a 4G LTE interface, and data information using a second set of antennae elements 314 configured to utilize a 5G NR air interface. Alternatively or in addition, each separate air interface maintains its own control and data transmissions. Further, antenna elements 314 may include an array of antenna elements that are configured to deploy air interfaces over one or more wireless sectors, form beams within these sectors, employ multiple-input-multiple-output (MIMO), etc. Different carriers deployed via antenna elements 314 using different frequencies can be aggregated using by a scheduler coupled to or included within memory 312. The carriers can use different frequency bands (inter-band carrier aggregation) or adjacent frequencies within a frequency band (intra-band carrier aggregation), and can be configured to use the same or different wireless interfaces. For example, multiple carriers using 5G NR can be aggregated.

Figure 4:
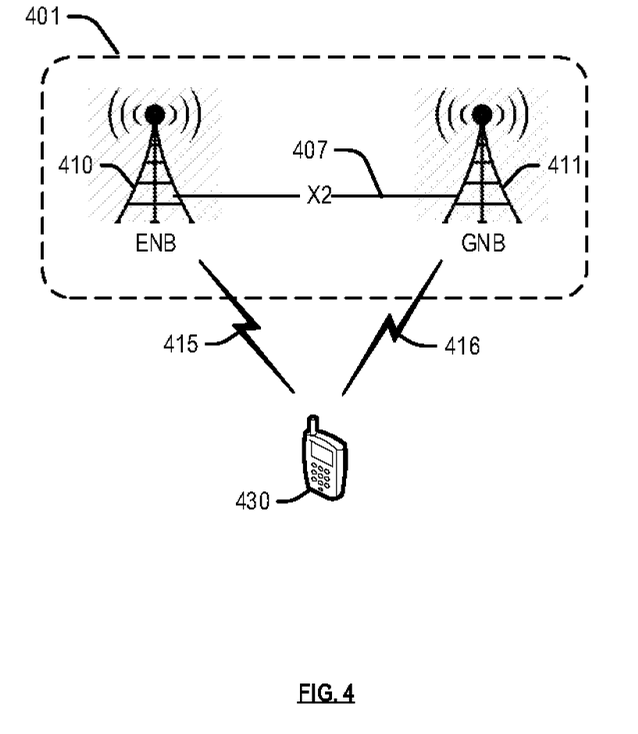
FIG. 4 depicts attaching to additional access nodes based on path loss and transmit power in an exemplary 5G EN-DC radio access network comprising collocated access nodes.

Exemplary instructions stored on memory 312 can include instructions for instructing wireless devices to identify additional access nodes to attach to and initiate handovers based on path loss and transmit power levels experienced by wireless devices attached to access node 310. Whereas previously, attaching to additional access nodes (i.e. dual-connectivity) as well as performing handovers to additional access nodes was performed solely based on reference signal levels, and triggered based on measurements of the reference signals (e.g. A4/A5 thresholds), access node 310 can be configured to enable identification of additional access nodes by wireless devices experiencing high path losses and utilizing high transmit power levels, and connecting to the additional access nodes with or without creating any data bearers depending on threshold path loss and uplink transmit power levels. Wireless devices are instructed to measure path losses from neighboring access nodes and initiate a parallel (or dual) connection with eligible neighboring access nodes. When the path loss level meets another high threshold, the wireless device can begin transmitting data to/from the eligible neighboring access nodes. Further, a MCS assigned to a wireless device results in the wireless device increasing an uplink transmit power to a threshold. The wireless device is then instructed to initiate parallel (or dual) connections with additional neighboring access nodes without activating any data bearers. Upon the transmit power increasing to meet another threshold, the wireless device is instructed to start transmitting/receiving data from the additional access nodes, thereby increasing throughput in poor radiofrequency conditions FIG. 4 depicts an exemplary 5G EN-DC radio access network (RAN) 401 with colocated access nodes. RAN 401 can include other components not shown herein for convenience, such as cell site routers, controllers, etc. Further, RAN 401 may be connected to other intermediate or core networks. In this exemplary embodiment, the collocated access nodes can include a eNodeB 410, and a gNodeB 411. For example, eNodeB 410 can be configured to deploy a wireless air interface 415 using a first radio access technology (RAT), e.g. 4G LTE, and gNodeB 411 can be configured to deploy a second wireless air interface 416 using a second RAT, e.g. 5G NR and/or mmW. Each RAT can be configured to utilize a different frequency band or sub-band, a different channel size or bandwidth, and so on. For example, the 5G NR wireless air interface 416 can be configured to utilize higher frequencies and larger channel bandwidths than the 4G LTE wireless interface 415.

Further, eNodeB 410 and gNodeB 411 can be configured to communicate using both RATs at the same time. For example, dual connections can be set up with wireless device 430 using both 4G and 5G wireless air interfaces 415, 416 respectively, the 4G wireless air interface 415 being used to transmit control information, and the 5G wireless air interface 416 being used to transmit data information. For example, a processing node within RAN 401 (for example, communicatively coupled to eNodeB 410, gNodeB 411, or any other network node) can be configured to determine whether or not wireless device 430 is capable of communicating using both RATs (e.g. capable of 5G EN-DC), and instruct the eNodeB 410 to broadcast an indicator in, for example, a system information message. Responsive to the indicator, wireless device 430 can attach to eNodeB 410 which can use the 4G carrier to control and set up a dual connectivity session with the wireless device 430. In other words, control information (including SIB messages) is transmitted from the eNodeB 410 using the 4G LTE air interface, while the 5G NR air interface is utilized for transmission of data via gNodeB 411. Using the 5G RAT for data transmissions is advantageous, as 5G provides higher bandwidths and frequencies versus 4G.

Further, within radio access network 401, eNodeB 410 and gNodeB 411 can be coupled via a direct communication link 407, which can include an X2 communication link for communicating control and data information. In an exemplary embodiment, gNodeB 411 includes logic to determine how to allocate data packets between eNodeB 410 and gNodeB 411, wherein the data packets flow between wireless device 430 and any external network node. Such logic may include a packet data convergence protocol (PDCP) function. Thus, RAN 401 can include a plurality of antenna elements (not shown herein) coupled to eNodeB 410 and gNodeB 411, with different antenna elements configured to deploy a different radio air interface using a different frequency.

Further, a processing node communicatively coupled to one or both of eNodeB 410 or gNodeB 411 can be configured to determine that wireless device 430, while attached to eNodeB 410, is experiencing one or more of a threshold path loss or a threshold uplink transmit power, and instructing the wireless device 430 to attach to one or more additional access nodes such as gNodeB 420. For example, a dual-connectivity mode of operation may be activated or enabled for the wireless device 430. Further, the path loss or uplink transmit power of the wireless device 430 may be between a first and second threshold, such that the wireless device 430 attaches to the gNodeB 420 without data bearers. Whereas, if the path loss or uplink transmit power of the wireless device 430 exceeds the second threshold, data bearers are set up between the wireless device 430 and the gNodeB 420. Further, in dual-connectivity mode, the wireless device 430 is instructed to maintain communication with the eNodeB 410 while attaching to the gNodeB 420.

Further, the wireless device 430 can be experiencing a threshold path loss in its communication link with the eNodeB 410, in which case it is further instructed to identify the gNodeB 420 as being associated with a path loss below the threshold path loss, based on reference signals from the gNodeB 420, as measured by the wireless device 430. Alternatively or in addition, the wireless device 430 can be experiencing a threshold uplink transmit power, in which case the wireless device 430 is instructed to identify the gNodeB 420 based on a reference signal measurement. For example, the threshold uplink transmit power is associated with an uplink transmission between the wireless device 430 and the eNodeB 410, and the signal measurement is performed for reference signals from the gNodeB 420. The wireless device 430 can measure an RSRP for example, and determine that it would use less uplink power upon which it initiates connections with gNodeB 420.

Figure 5:
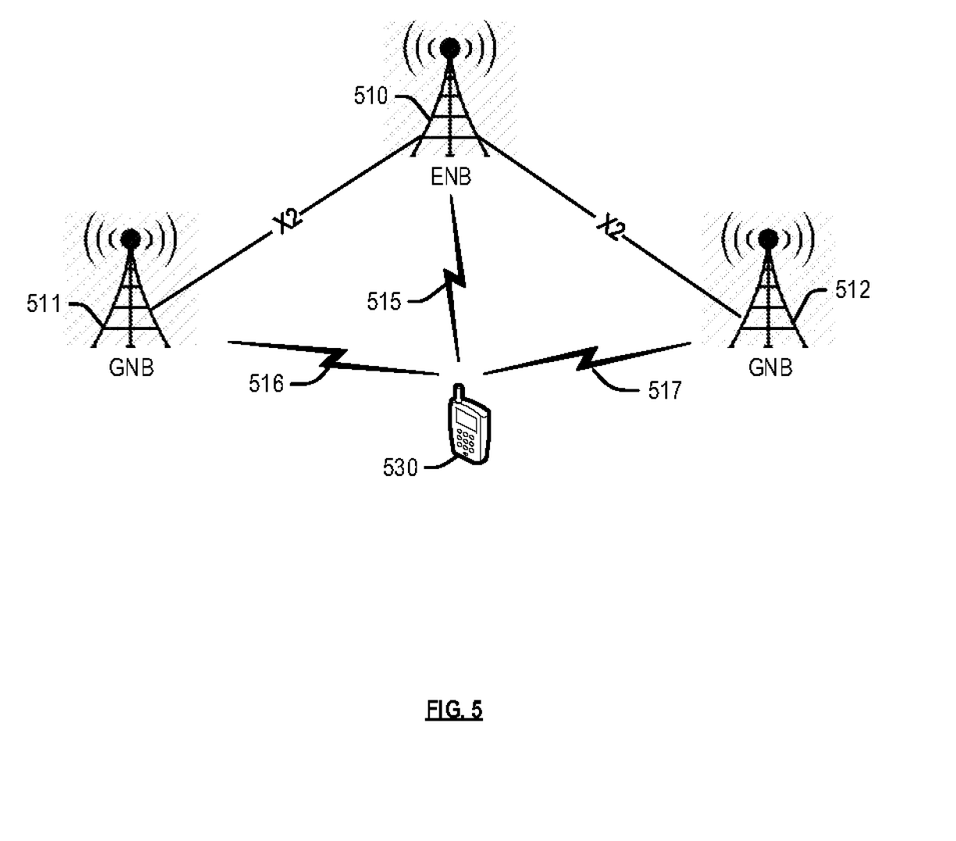
FIG. 5 depicts attaching to additional access nodes based on path loss and transmit power in an exemplary 5G EN-DC radio access network comprising distributed access nodes.

FIG. 5 depicts another 5G EN-DC system using distributed access nodes. Each of RANs 501, 502, 503 includes at least one access node. This embodiment depicts a one-to-many configuration, in which an eNodeB 510 is designated as a primary access node for wireless devices (such as wireless device 530), and one or more gNodeBs 511, 512 are selected as secondary access nodes, as further described below. Persons having ordinary skill in the art may note that other components may be included in any combination, without materially affecting the scope and spirit of the described embodiments.

In this exemplary embodiment, eNodeB 510 can be configured to deploy a wireless interface 515 using a first radio access technology (RAT), e.g. 4G LTE, and gNodeBs 511, 512 can be configured to deploy wireless interfaces using a second RAT, e.g. 5G NR. Further, eNodeB 510 and gNodeBs 511, 512 can be configured to communicate using both RATs at the same time. For example, dual connections can be set up with one wireless device 530 using both 4G and 5G air interfaces respectively, the 4G wireless interface 515 being used to transmit control information, and one of the 5G wireless interfaces (e.g. 5G wireless interface 516) being used to transmit data information. For example, a processing node communicatively coupled to eNodeB 510 can be configured to determine whether or not wireless device 530 is capable of communicating using both RATs (e.g. capable of 5G EN-DC), and instruct the eNodeB 510 to broadcast an indicator in, for example, a system information message. Responsive to the indicator, wireless device 530 can attach to eNodeB 510 which can use the 4G carrier to control and set up a dual connectivity session with wireless device 530. Further, eNodeB 510 can be configured to select one (or more) of gNodeBs 511, 512 as a secondary access node, to transport user data. In other words, control information (including SIB messages) is transmitted from the eNodeB node 510 using the 4G LTE air interface, while the 5G NR air interfaces (e.g. 5G NR wireless air interface 516) is utilized for transmission of data. Further, gNodeBs 511 and 512 (hereinafter "secondary access nodes") can each be coupled to eNodeB 510 (hereinafter "primary access node") via X2 communication links. In an exemplary embodiment, each secondary access node can include logic to determine how to allocate data packets between the access nodes, wherein the data packets flow between wireless device 530 and a network node not shown herein. Such logic may include a packet data convergence protocol (PDCP) function.

Further, a processing node communicatively coupled to any of eNodeB 510 or gNodeB 511 can be configured to determine that wireless device 530, while attached to eNodeB 510 and/or gNodeB 511, is experiencing one or more of a threshold path loss or a threshold uplink transmit power, and instructing the wireless device 530 to attach to one or more additional access nodes such as gNodeB 512. Further, the path loss or uplink transmit power of the wireless device 530 may be between a first and second threshold, such that the wireless device 530 attaches to the gNodeB 512 without data bearers. Whereas, if the path loss or uplink transmit power of the wireless device 530 exceeds the second threshold, data bearers are set up between the wireless device 530 and the gNodeB 512. Further, in dual-connectivity mode, the wireless device 530 is instructed to maintain communication with the eNodeB 510 while attaching to the gNodeB 512. Further, the wireless device 530 can be experiencing a threshold path loss in its communication link with the gNodeB 511, in which case it is further instructed to identify the gNodeB 512 as being associated with a path loss below the threshold path loss, based on reference signals from the gNodeB 512, as measured by the wireless device 530. Alternatively or in addition, the wireless device 530 can be experiencing a threshold uplink transmit power, in which case the wireless device 530 is instructed to identify the gNodeB 512 based on a reference signal measurement. For example, the threshold uplink transmit power is associated with an uplink transmission between the wireless device 530 and the gNodeB 511, and the signal measurement is performed for reference signals from the gNodeB 512. The wireless device 530 can measure an RSRP for example, and determine that it would use less uplink power upon which it initiates connections with gNodeB 512.

Various other combinations of these operations may be envisioned by those having ordinary skill in the art in light of this disclosure, including the operations further described below with reference to FIGS. 6-8.

Figure 6:
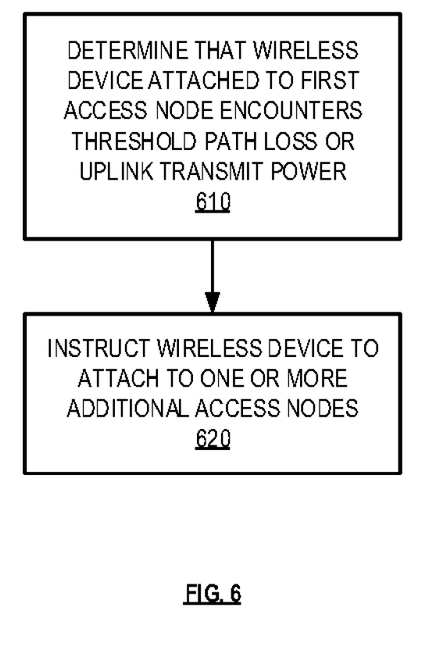
FIG. 6 depicts an exemplary method for attaching to additional access nodes based on path loss and transmit power.

FIG. 6 depicts an exemplary method for attaching to additional access nodes. The method of FIG. 6 may be implemented by a processing node communicatively coupled to one or more access nodes, controller nodes, or any other network node. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that a wireless device attached to a first access node encounters a threshold path loss or uplink transmit power, responsive to which at 620 it is instructed to attach to one or more additional access nodes. Further, in dual-connectivity mode, the wireless device is instructed to maintain communication with the first access node while attaching to the one or more additional access nodes. In an exemplary embodiment, the first access node comprises a eNodeB, and the one or more additional access nodes comprise gNodeBs, such that EN-DC is activated for the wireless device as it initiates a dual connection with one or more gNodeBs while remaining attached to the eNodeB. In another exemplary embodiment, the first access node and the one or more additional access nodes comprise eNodeBs that are each coupled to at least one gNodeB. In this case, the wireless device may be selecting between primary access nodes in a dual-connectivity system, and may subsequently request a handover to the one or more additional access nodes from the first access node. In another exemplary embodiment, the first access node and the one or more additional access nodes comprise gNodeBs that are each coupled to a eNodeB. In this case, the wireless device may be selecting between secondary access nodes in a dual-connectivity system, while remaining attached or connected to an eNodeB. In either case, the method can further include initiating a handover procedure of the wireless device to one of the one or more additional access nodes. For example, when the first access node signal level drops, the target access node is already pre-selected from at least one of the one or more additional access nodes.

Figure 7:
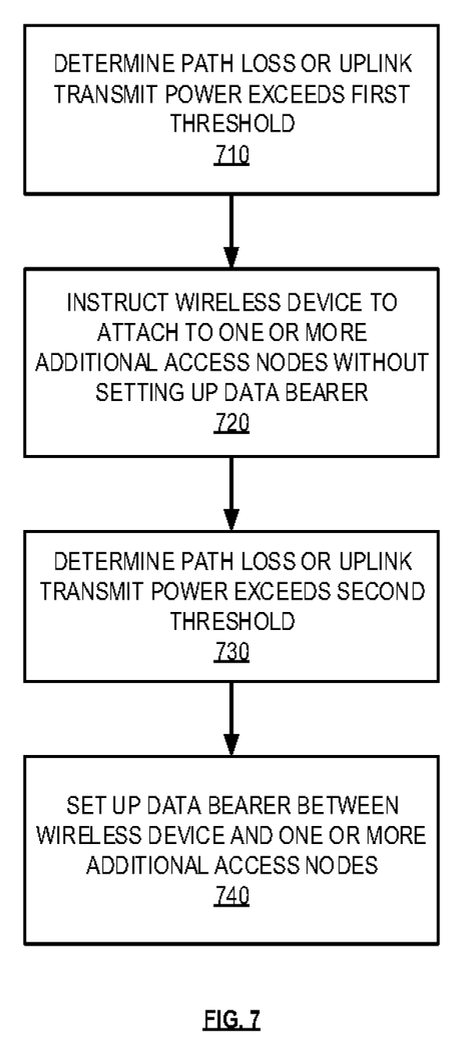
FIG. 7 depicts another exemplary method for attaching to additional access nodes based on path loss and transmit power.

FIG. 7 depicts another exemplary method for attaching to additional access nodes. The method of FIG. 7 may be implemented by a processing node communicatively coupled to one or more access nodes, controller nodes, or any other network node. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, it is determined that a wireless device experiences a path loss or uplink transmit power that exceeds a first threshold, responsive to which, at 720, the wireless device is instructed to attach to the one or more additional access nodes without setting up a data bearer. In other words, the path loss or uplink transmit power of the wireless device may be between a first and second threshold, such that the wireless device attaches to the one or more additional access nodes without data bearers. Whereas, at 730, if the path loss or uplink transmit power of the wireless device exceeds the second threshold, then at 740, data bearers are set up between the wireless device and the one or more additional access nodes. In an exemplary embodiment, a first path loss threshold comprises 110 dBm and a second path loss threshold comprises 130 dBm. In another exemplary embodiment, a first threshold uplink transmit power level comprises 20 dBm and a second threshold uplink transmit power level comprises 22 dBm. Other thresholds are possible and may become apparent to those having ordinary skill in the art in light of this disclosure, depending on the systems in which they are implemented.

Figure 8:
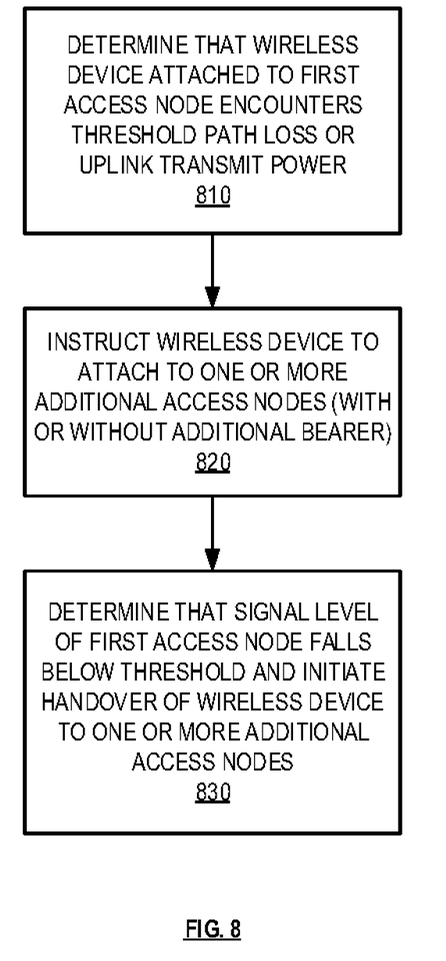
FIG. 8 depicts another exemplary method for attaching to additional access nodes based on path loss and transmit power.

FIG. 8 depicts another exemplary method for attaching to additional access nodes. The method of FIG. 8 may be implemented by a processing node communicatively coupled to one or more access nodes, controller nodes, or any other network node. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, it is determined that a wireless device attached to a first access node encounters a threshold path loss or uplink transmit power, upon which at 820 a dual-connectivity mode is activated, in which the wireless device is instructed to maintain communication with the first access node while attaching to the one or more additional access nodes. In an exemplary embodiment, the first access node comprises a eNodeB, and the one or more additional access nodes comprise gNodeBs, such that EN-DC is activated for the wireless device as it initiates a dual connection with one or more gNodeBs while remaining attached to the eNodeB. In another exemplary embodiment, the first access node and the one or more additional access nodes comprise eNodeBs that are each coupled to at least one gNodeB. Further, at 830 it is determined that a signal level of the first access node falls below a threshold, upon which a handover of the wireless device may be triggered. For example, the wireless device may be selecting between primary access nodes in a dual-connectivity system, and may subsequently request a handover to the one or more additional access nodes from the first access node. In another exemplary embodiment, the first access node and the one or more additional access nodes comprise gNodeBs that are each coupled to a eNodeB. In this case, the wireless device may be selecting between secondary access nodes in a dual-connectivity system, while remaining attached or connected to an eNodeB. In either case, the method can further include initiating a handover procedure of the wireless device to one of the one or more additional access nodes. For example, when the first access node signal level drops, the target access node is already pre-selected from at least one of the one or more additional access nodes.

Additional combinations and permutations of the aforementioned operations may be envisioned by those having ordinary skill in the art in light of this disclosure. Further, while 4G LTE and 5G NR are described in the above embodiments, the disclosed operations may apply to different combinations of radio air interfaces, including any combination of radio air interfaces within the same or different radio-access technologies, such as multiple different 4G carriers, 5G carriers, or any future wireless technology.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for attaching to additional access nodes in a wireless network, the method comprising:
   initiating a handover procedure of a wireless device from an eNodeB to one or more gNodeBs;
   responsive to the wireless device attached to the eNodeB having path loss that meets or exceeds a first path loss threshold and an uplink transmit power that meets or exceeds a first uplink transmit power threshold, instructing the wireless device to initiate a dual connection with the one or more gNodeBs without setting up a data bearer and remaining attached to the eNodeB; and
   responsive to the path loss and the uplink transmit power exceeding a second path loss threshold greater than the first path loss threshold and second uplink transmit power threshold greater than the first uplink transmit power threshold, setting up the data bearer between the wireless device and the one or more gNodeBs.

2. The method of claim 1, further comprising instructing the wireless device to maintain communication with the eNodeB while attaching to the one or more gNodeBs.

3. The method of claim 2, wherein the eNodeB is coupled to at least one gNodeB.

4. The method of claim 2, wherein the one or more gNodeBs are each coupled to an eNodeB.

5. The method of claim 1, the method further comprising: responsive to the wireless device attached to the eNodeB having path loss that meets or exceeds the first path loss threshold, instructing the wireless device to identify the one or more gNodeBs as those being associated with a path loss below the first path loss threshold.

6. The method of claim 5, wherein identifying the one or more gNodeBs associated with the path loss below the first path loss threshold is based on reference signals from the one or more gNodeBs.

7. The method of claim 1, the method further comprising: responsive to the wireless device attached to the eNodeB having uplink transmit power that meets or exceeds the first uplink transmit power threshold, instructing the wireless device to identify the one or more gNodeBs as those being associated with an uplink transmit power that is below the first uplink transmit power threshold based on a reference signal measurement.

8. A system for attaching to additional access nodes based on path loss and uplink transmit power, the system comprising:
   a processing node; and
   a processor coupled to the processing node, the processor being configured to perform operations comprising:
   initiating a handover procedure of a wireless device from an eNodeB to one or more gNodeBs;
   responsive to the wireless device attached to the eNodeB a path loss that meets or exceeds a first path loss threshold and an uplink transmit power that meets or exceeds a first uplink transmit power threshold, instructing the wireless device to initiate a dual connection with the one or more gNodeBs without setting up a data bearer; and
   responsive to the path loss and the uplink transmit power exceeding a second path loss threshold greater than the first path loss threshold and second uplink transmit power threshold greater than the first uplink transmit power threshold, setting up the data bearer between the wireless device and the one or more gNodeBs.

9. The system of claim 8, wherein the wireless device maintains communication with the eNodeB while attaching to the one or more gNodeBs.

10. The system of claim 9, wherein the eNodeB is coupled to at least one gNodeB.

11. The system of claim 9, wherein the one or more gNodeBs are each coupled to an eNodeB.

12. The system of claim 8, wherein:
the operations further comprise: responsive to the wireless device attached to the eNodeB having path loss that exceeds the first path loss threshold, instructing the wireless device to identify the one or more gNodeBs as those being associated with a path loss below the first path loss threshold.

13. The system of claim 8, wherein:
the operations further comprise: responsive to the wireless device attached to the first access node having uplink transmit power that exceeds the first uplink transmit power threshold, instructing the wireless device to identify access nodes as those being associated with an uplink transmit power that is below the first uplink transmit power threshold based on a reference signal measurement.

14. A processing node for attaching to additional access nodes in a wireless network, the processing node being configured to perform operations comprising:
initiating a handover procedure of a wireless device from an eNodeB to one or more gNodeBs;
responsive to a wireless device attached to the eNodeB having path loss that exceeds a first path loss threshold and an uplink transmit power that exceeds a first uplink transmit power threshold, instructing the wireless device to initiate a dual connection with the one or more gNodeBs while remaining attached to the eNodeB without setting up a data bearer; and
responsive to the path loss and the uplink transmit power exceeding a second path loss threshold greater than the first path loss threshold and second uplink transmit power threshold greater than the first uplink transmit power threshold, setting up the data bearer between the wireless device and the one or more gNodeBs.

15. The processing node of claim 14, wherein the operations further comprise:
determining that a signal level of the eNodeB falls below a threshold; and
initiating a handover of the wireless device to the one or more gNodeBs.

* * * * *